United States Patent [19]
Graves et al.

[11] Patent Number: 4,836,081
[45] Date of Patent: Jun. 6, 1989

[54] TOGGLE RELEASE

[75] Inventors: Thomas J. Graves; Robert A. Yang; Christopher W. Brown, all of Houston, Tex.

[73] Assignee: The United States of America as represented by the Administrator of the National Aeronautics and Space Administration, Washington, D.C.

[21] Appl. No.: 154,712

[22] Filed: Feb. 11, 1988

[51] Int. Cl.[4] ............................................. B64D 1/12
[52] U.S. Cl. .................... 89/1.14; 294/82.26; 89/1.57; 102/378
[58] Field of Search ............. 89/1.14, 1.57; 102/377, 102/378; 294/82.26, 82.32

[56] References Cited

U.S. PATENT DOCUMENTS

| | | | |
|---|---|---|---|
| 2,489,984 | 11/1949 | Shoemaker | 89/1.57 |
| 2,779,283 | 1/1957 | Baughman | 102/377 |
| 3,024,592 | 3/1962 | Leaman | 60/637 |
| 3,071,404 | 1/1963 | Van Hove | 89/1.1 |
| 3,084,597 | 4/1963 | Beyer | 89/1.14 |
| 3,116,663 | 1/1964 | Musgrave | 294/82.26 |
| 3,119,298 | 1/1964 | Brown | 89/1.14 |
| 3,200,706 | 8/1965 | Kinard | 89/1.57 |
| 3,445,133 | 5/1969 | Reischl | 294/82.32 |
| 3,477,333 | 11/1969 | Boyd et al. | 102/377 |
| 4,682,804 | 7/1987 | Palmer et al. | 294/82.26 |

*Primary Examiner*—David H. Brown
*Attorney, Agent, or Firm*—Russell E. Schlorff; John R. Manning; Edward K. Fein

[57] ABSTRACT

A pyrotechnic actuated structural release device 10 which is mechanically two fault tolerant for release. The device 10 comprises a fastener plate 11 and fastener body 12, each attachable to a different one of a pair of structures to be joined. The fastener plate 11 and body 12 are fastenable by a toggle 13 supported at one end on the fastener plate and mounted for universal pivotal movement thereon. At its other end which is received in a central opening in the fastener body 12 and adapted for limited pivotal movement therein the toggle 13 is restrained by three retractable latching pins 61 symmetrically disposed in equiangular spacing about the axis of the toggle 13 and positionable in latching engagement with an end fitting on the toggle. Each pin 61 is individually retractable by combustion of a pyrotechnic charge 77, the expanding gases of which are applied to a pressure receiving face 67 on the latch pin 61 to effect its retraction from the toggle. While retraction of all three pins 62 releases the toggle, the fastener is mechanically two fault tolerant since the failure of any single one or pair of the latch pins to retract results in an asymmetrical loading on the toggle and its pivotal movement to effect a release. An annular bolt 18 is mounted on the fastener plate 11 as a support for the socket mounting 30, 37 of the toggle whereby its selective axial movement provides a means for preloading the toggle.

7 Claims, 3 Drawing Sheets

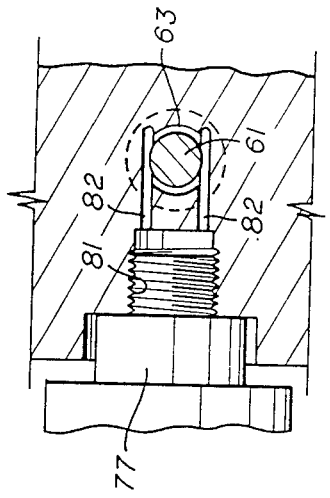
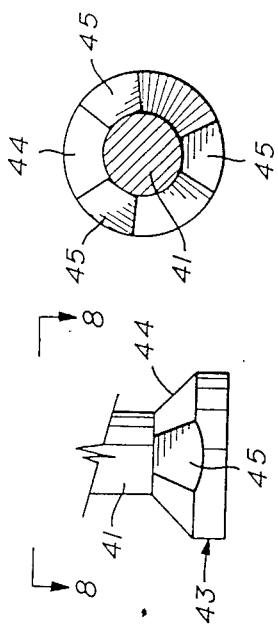
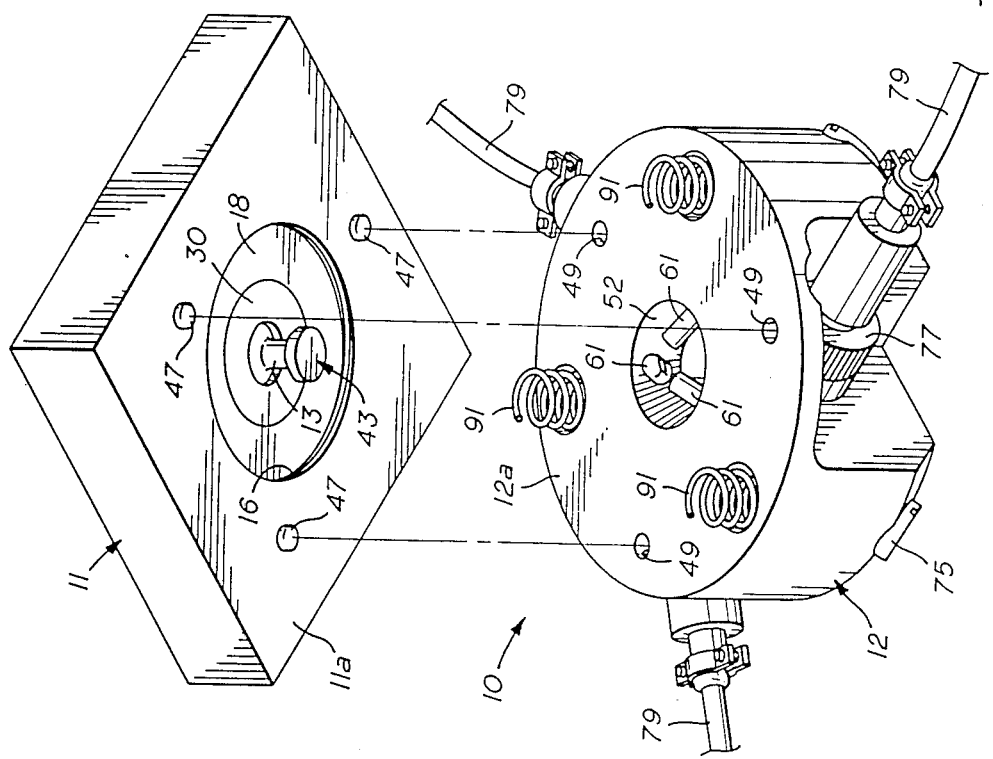

TOGGLE RELEASE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

This invention relates generally to releasable fasteners and more particularly to an explosive actuated release mechanism which is mechanically two fault tolerant for effecting release.

For aerospace applications, structural release devices must be extremely reliable particularly when required to operate in a potentially catastrophic event. It is desirable that the release device be able to sustain great loads, be adaptable to a variety of configuration and load requirements, and yet be of relatively light weight and size. It may also be important that the device transmit a very low impulse into adjacent structure upon its actuation and that there be no ejected pieces or debris following release.

2. Background Art

There have been many designs for releasable fasteners including explosively releasable fasteners. Most of these are mechanically zero fault tolerant since failure of a single component renders them inoperative. As an example, redundant pin pullers for release of a toggle have been employed in a releasable fastener. Clamps, such as a Marmon clamp assembly, have also been used which utilize two bolts for joining structures together wherein each bolt is severable by an independent pair of cutters. In such designs, however, failure of multiple components will not effect a release.

Releasable fasteners which employ a single explosive device for retracting or shearing a single latching member are shown in U.S. Pat. Nos. 3,024,592; 3,084,597; and 3,119,298. Other releasable fasteners, wherein a single explosive device is used to retract a plurality of latching members are shown in U.S. Pat. Nos. 2,489,984 and 3,071,404. In U.S. Pat. No. 2,779,283, a connector is shown for securing an aerial vehicle to a booster rocket wherein the rocket gases cause the retraction of a pair of latching pawls in effecting a release. None of these devices, however, are mechanically two fault tolerant for effecting release.

SUMMARY OF THE INVENTION

This invention is a releasable fastener which is particularly suited for releasably connecting structures to be used in the space environment or in aerospace applications. The releasable fastener comprises a fastener plate member and a fastener body member, each of which is separately attachable to a different one of a pair of structures to be detachably joined. The fastener plate and fastener body members are adapted to be fastened to one another by a toggle. The toggle is supported at one end in a concave bearing surface in a socket carried by the fastener plate member and adapted for universal pivotal movement thereon. At its other end the toggle is constrained by three latching pins carried by the fastener body member. The three pins are slidably disposed in pin receiving bores arranged in symmetrical equiangular spacing about the axis of the toggle. Each pin is adapted to be positioned with an end portion engaged with a shoulder provided on the end portion of the toggle so as restrain the toggle from axial movement in the direction towards the fastener plate. Each pin is individually retractable by combustion of a pyrotechnic charge, the expanding gases of which are communicated and applied to a pressure receiving face of the latch pin to effect its retraction and disengagement from the toggle, however, other means such as pneumatic or hydraulic systems, etc., could also be employed.

The simultaneous retraction of all the pins results in release of the toggle and the structures joined thereby. However, because of the symmetrical equiangular spacing of the contacts between the latching pins and the toggle, the successful retraction of any single pin or combination of pins results in an asymmetrical loading on the toggle to cause its pivotal movement to free itself from the latching pins and effect a release. Accordingly, the pyrotechnic releasable fastener of this invention is two fault tolerant since failure of as many as two of the latching pins to retract will not prevent release of the fastened structures. The fastener also includes sealing means for containing the gaseous products of charge combustion. In addition means are provided for selectively applying a pre-load to the toggle in its fastened condition for avoiding fatiguing of fastener components on being subjected to stress conditions such as during the launch and boost phases of a space flight.

Other advantages of this invention will be apparent from the descriptions which follow, in conjunction with the accompanying drawings and claims.

BRIEF DESCRIPTION OF THE DRAWINGS

FIG. 1 is an exploded view in perspective of the principal components of a preferred embodiment of the pyrotechnic releasable fastener of the invention;

FIG. 6 is a fragmentary sectional view taken along the section indicated in FIG. 5 and showing the passages which interconnect the pyrotechnic accommodating chamber with the annular pressure receiving face provided on a latching pin for effecting retraction of the latching pin by application of explosive generated gas pressures;

FIG. 7 is a fragmentary side view of the fastener toggle member showing the end thereof which is adapted to be held by the latching pins when disposed in symmetrical latching engagement therewith; and FIG. 8 is a sectional view of the toggle member taken along the section line indicated in FIG. 7.

DETAILED DESCRIPTION OF THE PREFERRED EMBODIMENT

Referring more particularly to the drawings, there is shown in FIG. 1, in exploded perspective view, a releasable fastener 10 which represents a preferred embodiment of the invention. The fastener 10 comprises a fastener plate 11 and a fastener body 12 which are adapted to be releasably coupled by a toggle 13. The fastener plate 11 may be provided with screw holes or bolt holes (not shown) for accommodating its rigid connection to a large structure, which is one of a pair of structures to be releasably fastened by the fastener 10. It may, of course, be secured by welding or any other suitable means.

In like manner, the fastener body 12 may be similarly secured to the other member of the pair of structures to be releasably joined.

Figure 4:
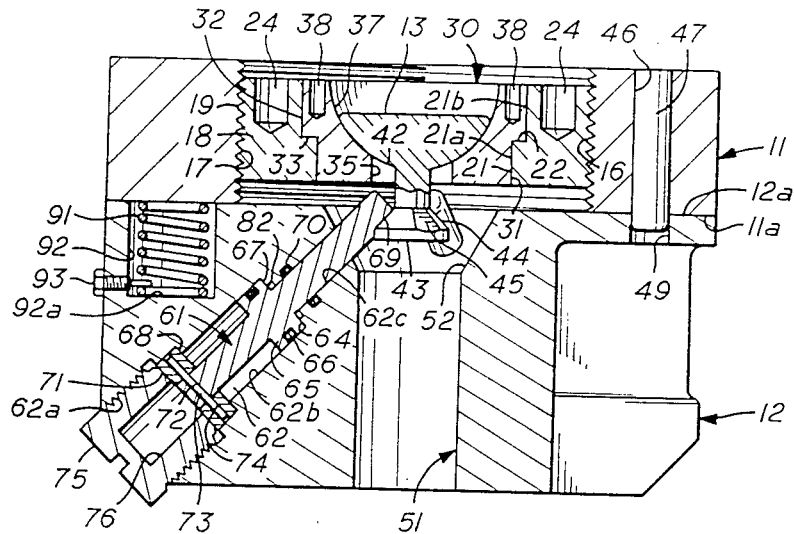
FIG. 4 is a view in cross-section of the fastener of FIG. 3 wherein the pyrotechnic devices for effecting retraction of latching pins are omitted for purposes of clarity.
Figure 5:
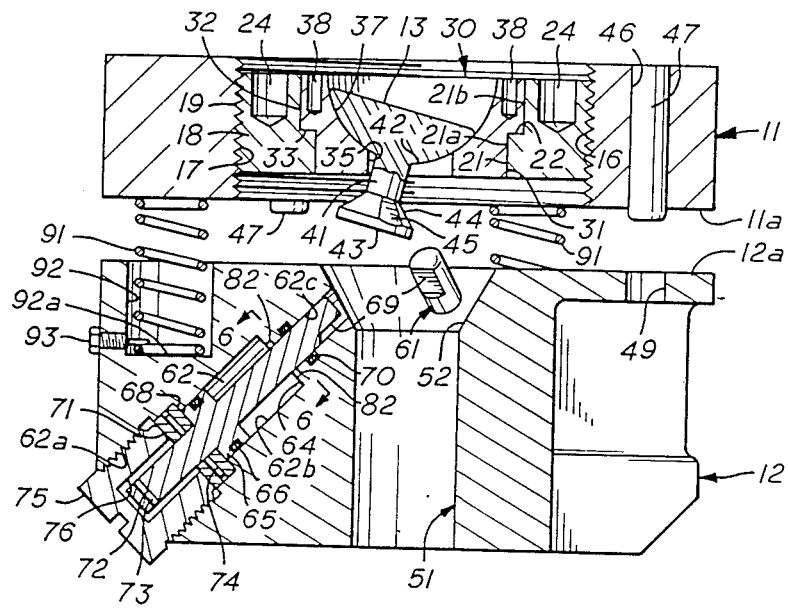
FIG. 5 is a view similar to FIG. 4 but showing the fastener in the act of separating and effecting release by the individual retraction of one of the latching pins.

As can be seen in FIGS. 4 and 5, the fastener plate 11 is provided with a large axial bore 16 extending therethrough which is provided with internal threads 17 for accommodating an externally threaded annular bolt 18 having external threads 19 for cooperative engagement with the threads 17. The bolt 18 is provided with a central axial bore 21 which is counterbored to provide an annular shoulder 22, a reduced diameter bore section 21a and a larger diameter bore section 21b. The end face of the bolt 18 is provided with two or more blind bores 24 whereby a tool might be applied thereto for effecting the threading of the bolt 18 into the bore 16.

The fastener plate 11 is also provided with an annular socket 30 which has external diameters 31, 32 corresponding to the internal diameters of the bore sections 21a, 21b, respectively and an annular shoulder 33 whereby the socket 30 seats snugly in the bolt 18 with the annular shoulder 33 seated against the shoulder 22 of bolt 18.

Socket 30 is also provided with a central axial bore 35 with a large central cavity defined by a hemispherical surface 37, the bottom of which is penetrated by the axial bore 35 in concentric coaxial relation. The face of socket 30 in which the hemispherical surface portion of bore 35 opens is provided with two or more blind bores 38 for receiving a tool whereby socket 30 may be held stationary while bolt 18 is turned.

The toggle 13 has a stem section 41 and an enlarged end portion with an external surface 42 conforming to that of the surface of the cavity 37. At its other end, the toggle is provided with a flared end portion 43 defined by a generally frusto-conical surface 44 terminating at an external diameter slightly smaller than that of the axial bore 35 of socket 30 whereby toggle 13 may be inserted through the socket 30 with its large end portion 42 seated on the hemispherical surface of the socket cavity. Accordingly the socket is adapted for universal pivotal movement thereon limited only by the wall of the bore 35. The frusto-conical surface of the flared end of the toggle 13 is also provided with three radially extending flat surfaces 45 equiangularly and symmetrically spaced in 120 degree spacing about the axis of the toggle stem 41, for purposes hereinafter described.

The fastener plate 11 is adapted to be disposed with its annular end surface 11a lying flat against the planar end surface 12a of the fastener body 12. It is also provided with a plurality of small bores 46 disposed in parallel with the central axis of the plate 11 and which accommodate a plurality of pins 47. The pins 47 are press fit into the bores 46 and extend slightly therefrom beyond the surface 11a whereby their protruding ends are adapted to be received in accommodating small bores 49 provided in the face 12a of fastener body 12. When the fastener plate 11 is thus positioned on fastener body 12, the pins 47 prevent axial rotation of the fastener plate 11 relative to the fastener body 12 and also preclude relative shear movement of plate 11 and the body 12.

The fastener body 12 is also provided with a central bore 51 which coaxially aligns with the central bores of the socket 30, bolt 18, and fastener plate 11 when the pins 47 are in place in the bores 49. The bore 51 is enlarged at the end thereof by a frustoconical surface 52 which opens in the surface 12a and is convergent inwardly to the cylindrical wall of the bore 51. The dimensions of the conical section of the bore 51 are such as to easily accommodate the flared end portion 43 of the toggle 13 and free pivotal movement of the toggle 13 to the extent allowed by its mounting on the fastener plate 11.

Figure 2:
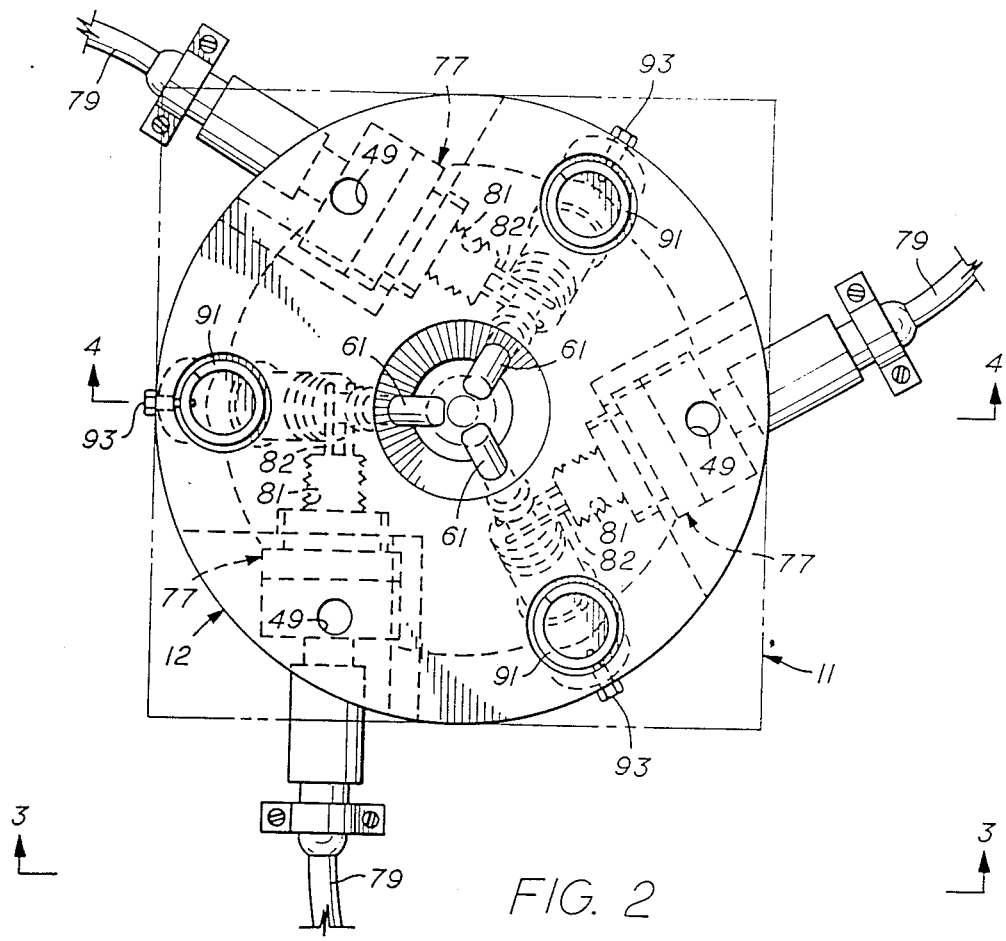
FIG. 2 is a top plan view of a fastener body member of the invention showing three latching pins carried thereon in symmetrical disposition about the shank of the toggle member of the fastener of FIG. 1.
Figure 3:
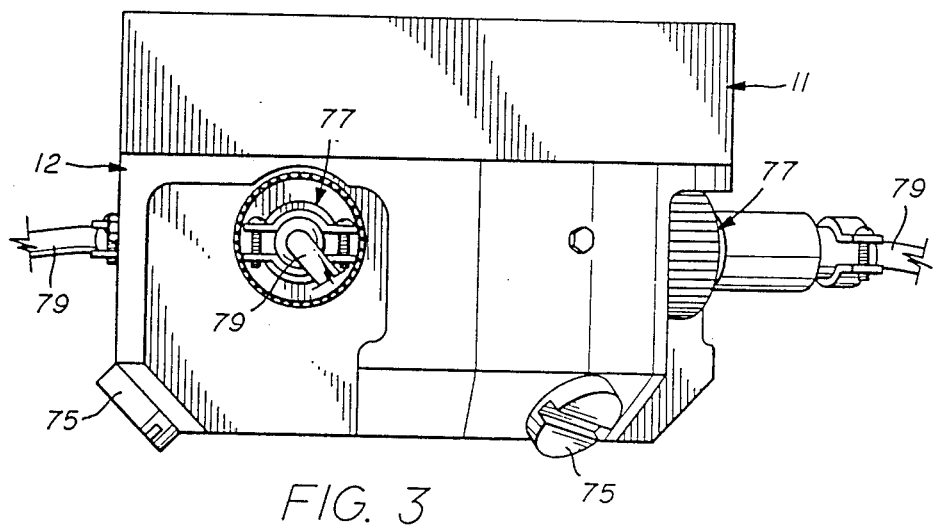
FIG. 3 is a side view of the fastener as it appears when assembled in fastening condition.

The fastener body 12 is also provided with three latching pins 61 which are retractably mounted in equiangularly spaced bores 62 in symmetrical array about the axis of the bore 51 with 120 degrees spacing. In FIG. 2 it can be seen that the axes of the three bores 62 are convergent at the axis of the fastener body bore 51 but, as also shown in FIG. 4, are not in a perpendicular relation therewith. Preferably the axis of a bore 62 is substantially parallel to the frustoconical surface 44 at the flared end 43 of the toggle 13 when the toggle is disposed coaxially with the bore 51.

It will also be seen that each bore 62 extends from the external surface of the fastener body 12 and opens into the frusto-conical surface 52. Each bore 62 is also comprised of a large diameter externally threaded section 62a at its outer end, an intermediate smooth walled section 62b of reduced diameter, and a smaller diameter section 62c which opens into the frusto-conical surface 52.

Each latching pin 61 is provided intermediate its ends with an annular flange 65 of an external diameter conforming to that of the intermediate bore section 62b so as to be slidably received therein. A circumferential groove about the flange 65 accommodates an o-ring seal 66 whereby a fluid-tight seal is established between the latching pin 61 and the wall of the bore section 62b. An annular shoulder 67 formed on the pin 61 by the flange 65 is adapted to seat against an internal shoulder 64 provided at the junction of the bore sections 62b and 62c. When thus seated, the end portion of the latching pin 61 which extends into the frusto-conical surface 52 engages the flared conical end portion of the toggle 13. To insure good contact with the toggle, the pin 61 is provided at its end portion with a flat surface 69 extending parallel to its axis and adapted to engage one of three flat surfaces 45 machined or otherwise formed on the conical surface 44 at the flared end of the toggle 13, as shown in FIGS. 7 and 8.

At its outer end portion, each latching pin 61 is provided with a retainer ring 71 which is sleeved thereon and a small bore 72 extending through the pin at right angles to its axis and closely adjacent the outer end of the pin. The bore 72 is for the purpose of accommodating a shear wire 73 which is received through the bore 72 and in diametrical aligned bores 74 provided in the retainer ring 71.

When the pin 61 is positioned in the bore 62 with its flange 65 in abutting engagement with the bore shoulder 64 and its inner end portion in latching engagement with toggle 13, the retainer ring 71 abuts the bore shoulder 68 provided at the junction of the bore sections 62a, 62b. Shear wire 73 holds the pin 61 in latching position. Retainer ring 71, which holds shear wire 73, is secured in place by means of a retainer cap 75 which is threaded into the bore section 62a until it clamps against the retainer ring 71. The cap 75 is provided with a central blind bore 76 extending inwardly from the end of the cap which clamps the retainer ring 71. The blind bore 76 is of sufficient diameter and axial extent that the latching pin 61 may be retracted therein on shearing of the shear wire 73.

It will therefore be seen that the fastener 10 may be assembled with the fastener plate 11 in abutting engagement with the fastener body 12 as seen in FIG. 4. The fastener plate 11 may then be latched to the fastener body 12 by latching engagement of the latch pins 61 with a flat surface 45 of the toggle 13. This may be accomplished by individually positioning each latching pin 61 so that its inner end engages the end of the toggle with the flat surface 69 of the pin in overlying abutting engagement with one of the flat surfaces 45 on the flared end of the toggle. Each pin 61 is inserted into the bore 62 with the retainer ring 71 and shear wire 73 installed. The pin may then be retained in the latching position by threading the retainer cap 75 into the threaded section 62a of the latch pin receiving bore 62 to clamp the retainer ring 71 against the bore shoulder 68.

Although the fastener may be assembled in its latching condition without any significant loading on the toggle 13, it is usually desirable that an axial pre-load be applied. Such a pre-load, conceivably in the range from zero to several thousand pounds, can be applied by rotation of the bolt 18 so that it is threaded outwardly of the plate bore 16 by a sufficient distance to apply a pre-determined axial loading on the toggle 13. In space vehicle assemblies, preloading is desirable to enable the fastener to withstand the stresses incurred at the time of launch and boost phases without exhibiting fatigue.

The fastener body 12 is also provided with three internally threaded bores 81, each of which is adapted to receive the threaded end of a pyrotechnic charge device 77. The three bores 81 are each provided with a small pair of bore extensions 82 which extend from the bore 81 to intersect with a latch pin receiving bore 62, whereby each bore 81 is associated with and in communication with a different one of the latch pin bores 62.

The charge device 77 is preferably a conventional pyrotechnic initiator or explosive squib of the type having a metallic housing with an externally threaded end portion for accommodating its installation into a charge receiving chamber such as the threaded bore 81. Each charge device 77 is provided with external electrical leads in a cable 79 for connecting in an electrical firing circuit to source of electrical energy (not shown). In conventional fashion the circuit may be selectively activated to cause the explosive to detonate.

As may best be seen in FIGS. 2, 4, and 5, the bore extensions 82 of a charge receiving bore 81 intersect an annular groove 63 formed in shoulder 64 for even pressure distribution.

On detonation of the pyrotechnic charge, the explosively expanding gases are communicated from the charge receiving bore 81 through the bore extensions 82 to the groove 63 which opens into the latch pin receiving bore 62. If any one of the bores 82 should become plugged, communication will still be accomplished through the other. With the latch pin seated in the bore 62 in latching engagement with the toggle 13, the explosive gases are applied against a pressure receiving face of the latch pin 61 which is provided by the shoulder 67.

Since the gases are blocked by an o-ring seal 70 in bore section 62c and o-ring 66, the explosive pressures acting on the pressure receiving face of the latch pin, are sufficient to sever the shear wire 73 and drive the latch pin 61 into the blind bore 76 of retainer cap 75. To avoid possible damage to the latch pin 61 and the cap 75, the bore 76 may be filled with shock-absorbent material such as a metallic honeycomb (not shown).

It is of course possible to provided firing circuitry whereby the three charge devices 77 are simultaneously detonated for simultaneous retraction of the three latching pins. While in most applications a simultaneous detonation and retraction is to be preferred, the charge devices 77 could be individually detonated in a selected sequence and firing circuits provided accordingly.

If all three explosive charges are detonated simultaneously and there is successful simultaneous retraction of the latch pins 61, the loads applied by the latch pins on the toggle 13 will be simultaneously removed and the toggle will be free to move in a substantially axial direction; however, if there is a failure of any one or two of the latching pins to retract, the loading force applied to the toggle end 43 by a latching pin 61 or pair of pins 61 still in contact therewith, will cause the toggle to cant or pivot on its universal mounting in the fastener plate 11 as shown in FIG. 5 so that it escapes from constraining contact with the non-retracted latch pins. Release of the toggle 13 allows separation of the fastener plate 11 from the fastener body 12. This pivotal movement of the toggle 13 to escape the latch pins 61 will always occur because the contact points of any one or two of the latching pins on the toggle end will always be on one side of the toggle. Such asymmetric loading to cause pivotal movement of the toggle will also occur if the pyrotechnic charges are fired in sequence and the latch pins retracted in sequence.

In the space environment, release of the toggle 13 and simultaneous removal of the axial preload on the toggle, will cause a separation of the fastener plate 11 and fastener body 12 and the large structures associated therewith. In certain applications, however, it may be desirable or even necessary to urge separation of the structures. For this purpose a plurality of spring receiving bores 92 may be provided in the face 12a of the fastener body 12 and each provided with a coiled spring 91 for seating therein. In the assembly of the fastener 10, each coiled spring 91 is disposed in a bore 92 with one end in abutting engagement with the end wall 92a of the bore and its other end in abutting engagement with the face 11a of the fastener plate 11. The springs 91 are of preselected size and length so that each is in the compressed state when the fastener 10 is fully assembled as may best be seen in FIG. 4. Each spring 91 therefore applies a constant bias for urging the separation of the fastener plate 11 from the fastener body 12 whereby on release of the toggle 13 by successful retraction of one or more of the latch pins 61, the springs 91 act in concert to forcibly separate the fastener plate 11 and fastener body 12 and thereby the larger structures to which they are secured.

For retention purposes, each spring 91 is adapted to be held in its bore 92 by a screw 93 which is received in a threaded screw hole extending through the wall of fastener body 12 and opening in the bore 92. Each screw 93 is installed with its shaft extending between the coils of spring 91, preferably near the lower coil, to thereby retain the spring. If located at a higher location, the screw would have to be withdrawn from contact with the spring after the fastener 10 is in fastened condition in order to allow the spring to exert an adequate biasing force against the plate 11.

It will therefore be seen that a unique explosively releasable fastener is disclosed herein which is mechanically two fault tolerant in effecting release. The failure of combustion of any one or two of the explosive devices or any other failure as would cause as many as two of the latching pins to fail to retract will not prevent the fastener 10 from a successful release.

It is also to be noted that the fastener of this invention has several other desirable features. Since the retraction mechanisms and the pyrotechnic forces associated therewith are contained within the fastener body, actuation of the fastener to effect a release is associated with a very desirable low impulse into the adjacent structure. In addition, because of the self-containment, there are no free pieces following release. It is also readily adaptable to a variety of configuration and load requirements and is self-centering during preloading.

It is also to be understood that the foregoing description of a preferred embodiment of the invention has been presented for purposes of illustration and explanation and it is not intended to limit the invention to the precise form disclosed. For example, while the invention has been described primarily as an pyrotechnic releasable fastener, it would be possible to use means other than the expanding gases of pyrotechnic devices for effecting retraction of the latching pins. Sources of fluid pressure, pneumatic and hydraulic, could be substituted for the pyrotechnic devices and valve-actuated to deliver pressurized fluid to the latch pin bores for effecting retraction of the pins. A further embodiment might employ switchable electromagnetic means for retracting a latching pin into the electromagnet coils. It is also possible that the deployment springs could be omitted or replaced by other devices such as a single large spring disposed concentric about the fastener axis. Also, the design of the fastener could be such that the latching pins can extend across the axial bore of the fastener body to achieve greater loads capability. In such instance, the pins could intersect the toggle bore obliquely by each passing through a grooved feature. The latching pin-toggle interface could also be different than shown as for example, a ball fitting on the toggle and a partial socket on the end of the latching pin.

It is to be appreciated, therefore, that changes may be made by those skilled in the art without departing from the spirit of the invention.

What is claimed is:

1. A pyrotechnic releasable fastener for releasably joining separable structures, said fastener comprising:
    a fastener plate and a fastener body, each of which is separately attachable to a different one of the structures to be jointed;
    a toggle member for releasably fastening the fastener plate to the fastener body,
    said toggle member being supported at a first end by the fastener plate and mounted thereon by a swivel coupling for universal pivotal movement about said first end, said fastener body having an opening in the face disposed towards the fastener plate of a size sufficient to receive a second end of the toggle member while allowing limited pivotal movement of the toggle member about the first end which is supported by the fastener plate;
    three retractable latching pins slidably mounted in latch pin receiving bores provided on the fastener body in symmetrical equiangular spacing about the second end of the toggle member received in said opening, said second end portion having contact shoulders symmetrically located about the axis of the toggle member, each latching pin being positionable with an end portion thereof in contact with a different one of said contact shoulders and in latching engagement with the second end portion of the toggle received in the opening of the fastener body whereby the toggle member is engaged and restrained by the latching pins at engagement points symmetrical with respect to the axis of the toggle member; and
    means for individually retracting each of said latching pins from latching engagement with the second end of the toggle member toggle by the application of combustion gases to the latching pins retraction of at least one of the latching pins resulting in release of the toggle member and said fastener plate from said fastener body by virtue of pivotal movement of the toggle member.

2. A pyrotechnic releasable fastener as described in claim 1 further including means on said fastener for selectively applying an axial pre-load on the toggle member when the fastener plate and fastener body are fastened together by the toggle member.

3. A pyrotechnic releasable fastener as described in claim 1 wherein each said latching pin is provided with an annular flange intermediate its ends, first seal means for establishing sealing engagement of the flange with the wall of the latch pin receiving bore second seal means intermediate said annular flange and the end of the latching pin engageable with said toggle for establishing a second seal between the latch pin and latch pin receiving bore, and detonatable charge devices mounted in individual charge receiving bores in the fastener body, each said charge receiving bore being in communication with a different one of said latch pin receiving bores at a point between said first and second seal means whereby explosive gases resulting from detonation of an explosive charge is communicated to the latch pin receiving bore in communication therewith and applied to a pressure receiving face on the latch pin to effect its retraction from the toggle member.

4. A pyrotechnic releasable fastener as described in claim 1 further including means for continually urging the separation of the fastener plate and fastener body when in their fastened condition.

5. A pyrotechnic releasable fastener as described in claim 1 wherein the toggle member is enlarged at said first end and provides a surface defined by a sector of a sphere and said fastener plate is provided with an annular socket member having a bearing surface for accommodating said first end of the toggle member.

6. A pyrotechnic releasable fastener as described in claim 5 wherein said fastener plate is provided with a threaded opening through the plate and said annular socket member is supported on an annular bolt threaded into said threaded opening whereby an axial pre-load may be applied to the toggle member by selective rotation of the bolt.

7. A fault tolerant releasable fastener for releasably joining separable structures, said fastener comprising:
    a fastener plate and a fastener body, each of which is separately attachable to a different one of the structures to be joined;
    a toggle member for releasably fastening the fastener plate to the fastener body, said toggle member being supported at a first end by the fastener plate and mounted thereon by a swivel coupling for universal pivotal movement about said first end, said fastener body having an opening in the face disposed towards the fastener plate of a size sufficient to receive a second end of the toggle member while allowing limited pivotal movement of the toggle member about the first end which is supported by the fastener plate;

three retractable latching pins slidably mounted in latch pin receiving bores provided on the fastener body in symmetrical equiangular spacing about the second end of the toggle member received in said opening, said second end portion having contact shoulders symmetrically located about the axis of the toggle member, each latching pin being positionable with an end portion thereof in contact with a different one of said contact shoulders and in latching engagement with the second end portion of the toggle received in the opening of the fastener body whereby said toggle is engaged and restrained by the latching pins at engagement points symmetrical with respect to the axis of the toggle member; and means for individually retracting each of said latching pins from latching engagement with the second end of the toggle member retraction of at least one of the latching pins resulting in release of the toggle member and said fastener plate from said fastener body by virtue of pivotal movement of the toggle member.

* * * * *